United States Patent [19]
Trepanier et al.

[11] 3,922,274
[45] Nov. 25, 1975

[54] DIHYDRO-1,2,4-TRIAZINOQUINAZOLINES

[75] Inventors: Donald L. Trepanier; Shyam Sunder, both of Midland, Mich.

[73] Assignee: The Dow Chemical Company, Midland, Mich.

[22] Filed: Nov. 4, 1974

[21] Appl. No.: 520,573

[52] U.S. Cl. .......................... 260/248 AS; 424/249
[51] Int. Cl.² ....................................... C07D 253/08
[58] Field of Search .............................. 260/248 AS

[56] References Cited
UNITED STATES PATENTS
3,873,543  3/1975  Berenyi et al. ...................... 260/248

*Primary Examiner*—John M. Ford
*Attorney, Agent, or Firm*—Maynard R. Johnson

[57] ABSTRACT

Triazinoquinazoline compounds such as 3,4-dihydro-2-methyl-6-(4-chlorophenyl)-2H-1,2,4-triazino [4,3-c]quinazoline are prepared by the reaction of 3-(2-aminophenyl)-1-methyl-1,4,5,6-tetrahydro-1,2,4-triazine with an ortho ester, or by reaction of the triazine with an acid chloride followed by cyclodehydration.

8 Claims, No Drawings

DIHYDRO-1,2,4-TRIAZINOQUINAZOLINES

SUMMARY OF THE INVENTION

This invention is concerned with triazinoquinazoline compounds and is particularly directed to 6-substituted 3,4-dihydro-1,2,4-triazino[4,3-c]quinazoline compounds and the isomeric triazino[2,3-c]quinazoline compounds of the formula

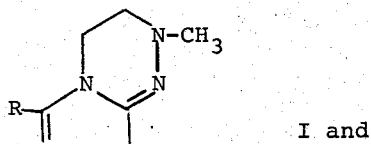 I and 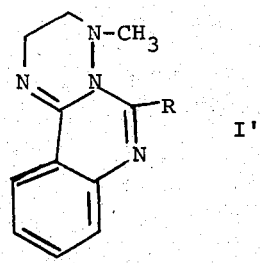 I' and their pharmaceutically acceptable acid addition salts. In the above formulae, and elsewhere in the present specification, R represents hydrogen, phenyl or substituted phenyl having one, two or three substituents selected from halo, cyano, and lower alkyl or loweralkoxy of one to three carbon atoms.

The term "halo" as herein employed refers to fluoro, chloro and bromo. The term "pharmaceutically acceptable salt" as herein employed refers to salts which are substantially non-toxic at dosage rates consistent with good pharmacological activity. Such pharmaceutically acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The compounds are crystalline solids at ordinary temperatures. The compounds have pharmacological activity, and can be administered to animals in the study of chemical effects on the central nervous system and respiratory tract. In particular the compounds can be used as anti-depressants, barbiturate potentiators, analgesics, or histamine antagonists, as indicated by their activity in standard pharmacological evaluation procedures. The type and degree of pharmacological activity typically varies some according to such factors as specific compound employed, dosage rate, dosage route, and size, age and species of animal and effect to be produced.

For pharmacological use the compounds of formula I are preferred, and compounds wherein R is hydrogen, phenyl or mono-substituted phenyl are particularly preferred.

PREPARATION OF THE TRIAZINOQUINAZOLINES

The compounds of the invention wherein R is other than hydrogen are prepared by the reaction of 3-(2-aminophenyl)-1-methyl-1,4,5,6-tetrahydro-1,2,4-triazine (Formula II) with an acid chloride of Formula III to obtain the corresponding 3-(2-acylaminophenyl)-1,4,5,6-tetrahydro-1-methyl-1,2,4-triazine intermediate the Formula IV, followed by thermal cyclodehydration of the intermediate of Formula IV to obtain the 6-substituted-3,4-dihydro-2-methyl-2H-1,2,4-triazino[4,3-c]quinazoline of Formula I.

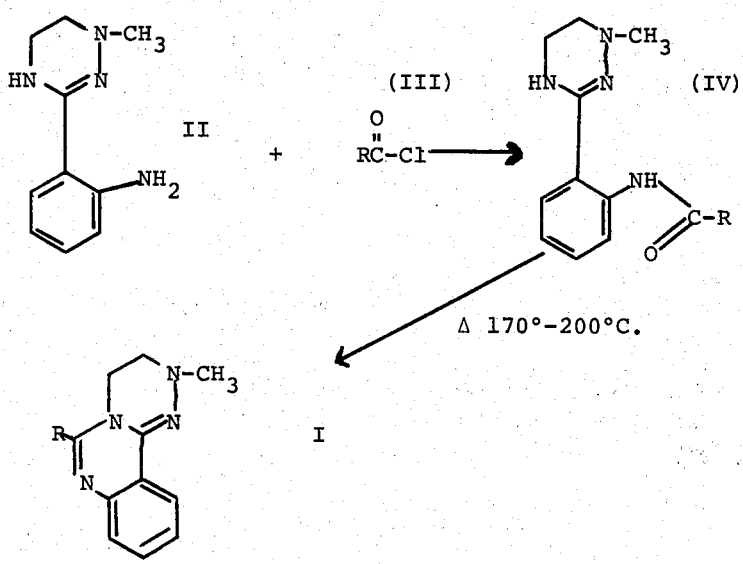

In the above formulae R has the significance set out above with respect to Formula I.

The reaction of the aminophenyltriazine and the acid chloride proceeds when the reactants are contacted and mixed, in the presence of an inert organic solvent as a reaction medium and a trialkylamine as a hydrogen halide acceptor. Suitable inert solvents include either halogenated hydrocarbons or methylene chloride as a preferred solvent. The reaction proceeds at temperatures from about 25° to the boiling temperature of the mixture. It is generally desirable to heat the reaction mixture to the boiling temperature under reflux. The reaction is generally complete within about 2 to about 12 hours, depending upon temperature and choice of solvent and acid chloride. The intermediate of Formula IV can be separated by conventional procedures, such as evaporation of reaction medium and unreacted aldehyde, or cooling of the reaction mixture to induce crystallization of the compound, followed by filtration. The intermediate product can be purified by conventional procedures such as recrystallization and washing.

The exact proportions of the reactants to be employed are not critical, some of the desired product being obtained when the reactants are combined over a wide range of proportions. The reaction consumes the reactants in equimolar proportions and in a preferred procedure, the reactants are employed in proportions from substantially equimolar amounts of each reactant to about 10 percent molar excess of either reactant.

The cyclodehydration of the 3-(2-acylaminophenyl)-1-methyl-1,4,5,6-tetrahydro-1,2,4-triazine is carried out by heating the triazine compound at a temperature of from about 170°–200°C. The reaction is preferably carried out without use of a solvent, and is generally complete in from about 0.5 to about 2 hours. The product can be purified by conventional procedures.

Compounds of the invention can also be prepared directly by reacting the 3-(2-aminophenyl)-1-methyl-1,4,5,6-tetrahydro-1,2,4-triazine with an orthoester of the formula $(CH_3CH_2O)_3CR$, wherein R is as defined above. The reaction proceeds when the reactants are contacted, mixed, and heated preferably in substantially equimolar proportions and preferably at the boiling temperature of the reaction mixture under reflux. After about 12 to about 24 hours the mixture is cooled and the product can be obtained as a residue which can be purified by conventional techniques. When R is hydrogen, the triazinoquinazoline is prepared by this procedure using triethylorthoformate.

In lieu of thermal cyclodehydration of the 3-(2-acylaminophenyl)-1-methyl-1,4,5,6-tetrahydro-1,2,4-triazines of formula IV, compounds of the invention can also be prepared by polyphosphoric acid catalyzed cyclodehydration of the triazine intermediate. The reaction proceeds when the triazine and sufficient polyphosphoric acid are contacted and mixed. Generally, a 10 to 20 fold excess by weight of polyphosphoric acid is preferred. The reaction proceeds at temperatures from about 0°C. to about 125°C. or higher, and is generally complete in from about 0.5 to about 3 hours. The product is obtained as a mixture with the corresponding 3,4-dihydro-4-methyl-6-substituted-2H-1,2,4-triazino[2,3-c]quinazoline isomer, corresponding to formula I'.

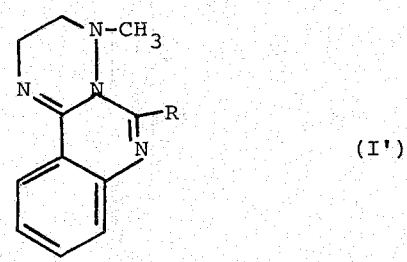

(I')

The relative amounts of the isomers can be changed by increasing reaction temperature to increase the concentration of the triazino [4,3-c]quinazoline isomer (formula I) in the product. The isomers can be separated by conventional procedures such as chromatography on silica gel with an ethyl acetate eluant, and separately purified by conventional procedures.

Compounds of formula I can also be prepared by sulfur catalyzed dehydrogenation of the corresponding 3,4,6,7-tetrahydro-triazino[4,3-c]quinazoline.

The pharmaceutically acceptable salts are conveniently prepared by dissolving the free base compound in a solvent such as diethyl ether and thereafter adding an excess of a pharmaceutically acceptable acid such as hydrochloric, hydrobromic, sulfuric, malic, maleic or p-toluenesulfonic acid or the like until precipitation of the product is complete. The product can be separated by conventional procedures such as evaporation, filtration or centrifugation and purified by conventional procedures such as recrystallization.

DESCRIPTION OF PREFERRED EMBODIMENTS

The following examples illustrate the invention but are not to be construed as limiting the same.

EXAMPLE 1

4 Grams of 3-(2-aminophenyl)-1-methyl-1,4,5,6-tetrahydro-1,2,4-triazine and 4 grams triethyl ortho formate are dissolved in minimal ethanol and the mixture is heated at the boiling temperature under reflux for about 18 hours. The ethanol is removed by evaporation; and the residue is washed twice with diethyl ether, then evaporated under reduced pressure. The residue is crystallized from a mixture of diethyl ether and hexane, separated by filtration, and recrystallized from diethyl ether. The 3,4-dihydro-2-methyl-2H-1,2,4-triazino[4,3-c]quinazoline product is found to melt at 55°–56°. Elemental analysis shows carbon, hydrogen and nitrogen contents of 66.16, 6.19 and 28.18 percent, respectively, as compared to calculated contents of 65.97, 6.04 and 27.98 percent, respectively.

EXAMPLE 2

The 3-(2-acylaminophenyl)-1,4,5,6-tetrahydro-1,2,4-triazines listed in Table I below are prepared as follows: 0.1 mole 3-(2-aminophenyl)-1-methyl-1,4,5,6-tetrahydro-1,2,4-triazine is mixed with 15 milliliters triethylamine and 300 milliliters of methylene chloride while a solution of 0.1 mole of the corresponding acid chloride of formula III in a minimal amount of methylene chloride is added dropwise with stirring. When the addition is complete, the reaction mixture is heated, with stirring, at the boiling temperature under reflux for about 6 hours. The mixture is cooled, washed with water, dried over anhydrous magnesium sulfate, and evaporated under reduced pressure to obtain the triazine intermediate.

TABLE I

| R | Melting Point, °C | Elemental Analysis Calcd. Found | | | | | |
|---|---|---|---|---|---|---|---|
| | | C | H | N | C | H | N |
| $C_6H_5$ | 125–126 | 69.36 | 6.16 | 19.03 | 69.31 | 6.38 | 18.73 |
| $3,4-Cl_2C_6H_3$ | 162–163 | 56.20 | 4.44 | 15.42 | 56.04 | 4.63 | 15.21 |
| $3-BrC_6H_4$ | 167–168 | 54.69 | 4.59 | 15.01 | 54.57 | 4.71 | 15.00 |

TABLE I -Continued

| R | Melting Point, °C | Elemental Analysis Calcd. Found | | | | | |
|---|---|---|---|---|---|---|---|
| | | C | H | N | C | H | N |
| 4—BrC$_6$H$_4$ | 166–167 | 54.69 | 4.59 | 15.01 | 54.50 | 4.62 | 14.91 |
| 4—O$_2$NC$_6$H$_4$ | 219–221 | 60.16 | 5.05 | 20.63 | 60.01 | 5.07 | 20.35 |
| 4—NCC$_6$H$_4$ | 206–208 | 67.69 | 5.36 | 21.93 | 67.71 | 5.25 | 21.68 |
| 2—CH$_3$C$_6$H$_4$ | 118–119 | 70.10 | 6.53 | 18.16 | 70.35 | 6.51 | 18.41 |
| 2—CH$_3$OC$_6$H$_4$ | 150–152 | 66.64 | 6.21 | 17.27 | 66.91 | 6.22 | 16.96 |
| 3,4,5—(CH$_3$O)C$_6$H$_2$ | 111–113 | 62.48 | 6.29 | 14.57 | 62.25 | 6.58 | 14.45 |
| 4—FC$_6$H$_4$= | 142–144 | 65.36 | 5.48 | 17.93 | 65.60 | 5.67 | 17.99 |

*Recrystallized from isopropanol, all others recrystallized from ethanol.

EXAMPLE 3

3-(2-Benzoylaminophenyl)-1-methyl-1,4,5,6-tetrahydro-1,2,4-triazine (5.0 grams) is stirred in 65 grams polyphosphoric acid at 100°C. for 1 hour. The mixture is cooled, diluted with ice and water, made alkaline by addition of sodium carbonate, and extracted with chloroform. The chloroform extract is washed with water, dried over anhydrous magnesium sulfate and evaporated under reduced pressure. The residue is passed through a column of 500 grams silica gel 60–200 mesh using ethyl acetate as an eluant. The first product recovered is 3,4-dihydro-2-methyl-6-phenyl-2H-1,2,4-triazino[4,3-c]quinazoline, a yellow crystalline solid melting at 142°–144°C. The second product is the white crystalline solid 3,4-dihydro-4-methyl-6-phenyl-2H-1,2,4-triazino[2,3-c]quinazoline, melting at 206°–207°C. Structure is confined by proton magnetic resonance and elemental analysis. The weight ratio of the first named product to the second named product is about 40:60.

The reaction is carried out again at 25°C. instead of 100°C. and the product ratio obtained is 60 parts of the first product to 40 parts of the second. The triazino[2,3-c]quinazoline isomers of the triazino[4,3-b]quinazolines listed in Table II, Example 4, are prepared in substantially the same procedure.

EXAMPLE 4

The compounds listed below in Table II are prepared by heating about 10 grams of the corresponding 3-(2-acylaminophenyl)-1-methyl-1,4,5,6-tetrahydro-1,2,4-triazine prepared as set out in Example 2 in an oil bath at 170°–200°C. for 1 hour. After cooling to room temperature, the residue is purified by recrystallization.

In standard pharmacological evaluation procedures, (See, e.g., U.S. Pat. Nos. 3,641,019 and 3,485,921) the compounds of Example 4 wherein R is 2-fluorophenyl, 3-bromophenyl or 4-fluorophenyl are found to block histamine induced contraction of isolated guinea pig trachea at a concentration of 120 milligrams per liter. The compounds of formula I wherein R is 2-fluorophenyl, 4-cyanophenyl, 4-bromophenyl, phenyl or hydrogen and of formula I' wherein R is phenyl, are all found to extend hexobarbital induced sleep in mice by a factor of at least two, when the test compounds are administered intraperitoneally at 60 milligrams per kilogram 30 minutes before hexobarbital. The compounds wherein R is 3-bromophenyl, 4-trifluoromethylphenyl or hydrogen are found to inhibit reserpine induced ptosis in mice at an equivalent dosage rate. In other operations, intraperitoneal administration of 60 mg/kg of compounds of Example 4 wherein R is hydrogen or 4-methylphenyl exhibit analgesic activity in inhibiting characteristic writhing induced in mice by intraperitoneal injection of aqueous hydrochloric acid.

The 2-aminophenyl triazine starting material can be prepared by reacting 2-aminophenyl cyanide with hydrogen sulfide in pyridine and triethylamine to obtain 2-aminophenylthiobenzamide, and then reacting the thiobenzamide with 1-methyl-1-(2-aminoethyl)hydrazine. For example, 100 grams of 2-aminophenyl cyanide in a mixture of 500–600 milliliters of pyridine and 100 milliliters triethylamine is stirred at about 25°C. while hydrogen sulfide is passed through the mixture for 3 hours. The product is separated, and 4 grams of the product are mixed with 1.8–2.0 grams 1-methyl-1(2-aminoethyl)hydrazine for 2 hours at about 100°–120°C. to drive off hydrogen sulfide of reaction. Ethanol is added and the mixture is boiled for 30 minutes under reflux, cooled, diluted with ether until a precipitate forms, and filtered. The aminophenyl triazine filter cake is recrystallized from isopropanol and found to melt at 140°–141°C.

What is claimed is:

TABLE II

| R | Melting Point, °C | Elemental Analysis Calcd. Found | | | | | |
|---|---|---|---|---|---|---|---|
| | | C | H | N | C | H | N |
| 2—FC$_6$H$_4$* | 132–133 | 69.37 | 5.13 | 19.03 | 69.60 | 5.11 | 19.10 |
| 4—FC$_6$H$_4$ | 157–158 | 69.37 | 5.13 | 19.03 | 69.65 | 18.97 | |
| | | | | | 5.03 | | |
| 4—CH$_3$C$_6$H$_4$* | 134–135 | 74.45 | 6.24 | 19.29 | 74.55 | 6.38 | 19.42 |
| 4—NCC$_6$H$_4$ | 189–190 | 71.73 | 5.01 | 23.24 | 71.46 | 4.99 | 22.98 |
| 3—BrC$_6$H$_4$ | 186–187 | 57.47 | 4.25 | 15.77 | 57.23 | 4.49 | 15.62 |
| 4—BrC$_6$H$_4$ | 183–184 | 57.47 | 4.25 | 15.77 | 57.41 | 4.51 | 15.81 |
| 3,4,5—(CH$_3$O)$_3$C$_6$H$_2$ | 186–187 | 65.55 | 6.05 | 15.29 | 65.59 | 6.19 | 15.01 |
| 3,4—Cl$_2$C$_6$H$_3$ | 184–185 | 59.14 | 4.08 | 16.23 | 59.19 | 4.21 | 16.08 |
| C$_6$H$_5$* | 142–143 | 73.88 | 5.83 | 20.27 | 73.62 | 5.73 | 19.99 |

*Recrystallized from isopropanol. All others recrystallized from ethanol.

1. A 1,2,4-triazino quinazoline selected from compounds corresponding to one of the formulae:

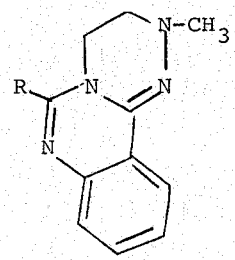 and 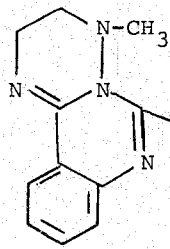

wherein R represents hydrogen, phenyl or substituted phenyl having one, two or three substituents selected from halo, cyano, and loweralkyl or loweralkoxy of one to three carbon atoms, and their pharmaceutically acceptable acid addition salts.

2. A compound of claim 1 wherein R represents hydrogen, phenyl or mono-substituted phenyl.

3. A compound of claim 2 wherein the compound is a 1,2,4-triazino[4,3-c]quinazoline.

4. A compound of claim 3 wherein R is hydrogen.

5. A compound of claim 1 wherein R is phenyl.

6. A method for preparing a 1,2,4-triazino[4,3-c]quinazoline of the formula

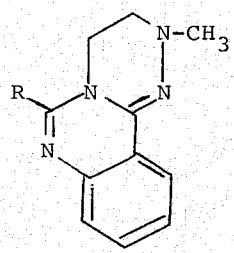

wherein R represents hydrogen, phenyl or substituted phenyl having one, two or three substituents selected from halo, cyano, and loweralkyl or loweralkoxy of one to three carbon atoms, which comprises heating a triazine compound corresponding to the formula

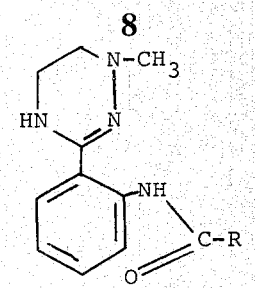

at a temperature of from about 170° to about 200°C. whereby cyclodehydration to the resulting 1,2,4-triazino[4,3-c]quinazoline occurs.

7. A method for preparing isomeric 1,2,4-triazino quinazolines corresponding to the formulae:

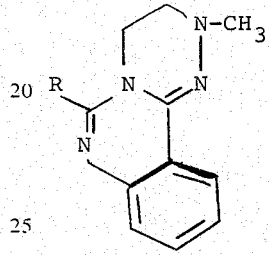 and 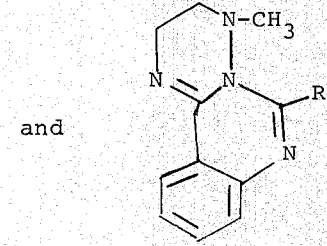

wherein R represents phenyl or substituted phenyl having one, two or three substituents selected from halo, cyano, and loweralkyl or loweralkoxy of one to three carbon atoms, comprising mixing a triazine compound of the formula

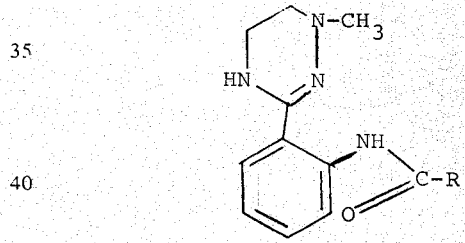

with excess polyphosphoric acid at a temperature of from about 20° to about 180°C., whereby cyclodehydration to the resulting 1,2,4-triazolo quinazolines occurs.

8. The method of claim 7 wherein R is phenyl.

* * * * *

UNITED STATES PATENT AND TRADEMARK OFFICE
CERTIFICATE OF CORRECTION

PATENT NO. : 3,922,274
DATED : November 25, 1975
INVENTOR(S) : Donald L. Trepanier; Shyam Sunder It is certified that error appears in the above-identified patent and that said Letters Patent are hereby corrected as shown below:

Column 2, line 24, delete "the" and insert --of--;

Column 5, Table I, last line of the Table, under the heading "R", "4-$FC_6H_4$=" should read --4-$FC_6H_4$*--;

Column 5, Table II, third line under the second "C" heading, "5.03" should be deleted and inserted under the second "H" heading, line 2;

Column 5, Table II, second line under the second "H" heading, delete "18.97" and insert it in the second line under the second "N" heading.

Signed and Sealed this first Day of June 1976

[SEAL]

Attest:

RUTH C. MASON
Attesting Officer

C. MARSHALL DANN
Commissioner of Patents and Trademarks